United States Patent [19]

Mutrux

[11] 4,196,877

[45] Apr. 8, 1980

[54] AIRCRAFT

[76] Inventor: Jean L. Mutrux, 6 Sumac La., St. Louis, Mo. 63124

[21] Appl. No.: 806,580

[22] Filed: Jun. 15, 1977

[51] Int. Cl.² .......................... B64C 27/22; B64C 3/12
[52] U.S. Cl. ................................. 244/12.2; 244/23 C;
                                                      244/17.19; 416/114
[58] Field of Search ................... 244/12.1, 12.2, 12.3,
            244/23 R, 23 C, 23 B, 17.19, 6, 91, 34 A, 45 R;
                                                                  416/114

[56] References Cited

U.S. PATENT DOCUMENTS

| | | | |
|---|---|---|---|
| 1,968,497 | 7/1934 | Magalis | 244/91 |
| 2,074,805 | 3/1937 | Platt | 244/17.19 |
| 2,410,545 | 11/1946 | Main | 416/114 |
| 2,876,964 | 3/1959 | Streib | 244/12.2 |
| 3,002,709 | 10/1961 | Cochran | 244/12.2 |
| 3,253,805 | 5/1966 | Taylor | 244/12.2 |
| 3,456,902 | 7/1969 | Visconti | 244/23 C |
| 3,640,485 | 2/1972 | Mutrux | 244/12.2 |

FOREIGN PATENT DOCUMENTS

1444868   5/1966   France ........................... 244/12.2

*Primary Examiner*—Galen L. Barefoot
*Attorney, Agent, or Firm*—Senniger, Powers, Leavitt and Roedel

[57] ABSTRACT

An aircraft comprising a generally annular wing structure surrounding a circular central structure to form an annular air duct, a pair of fuselages extending longitudinally at opposite sides of the aircraft, and rotor blades extending radially across the air duct from the central structure and rotatable relative to the central structure around the duct for inducing airflow through the duct to effect a lift on the aircraft. The annular wing structure consists of forward and rear wings forming air foils, the forward wing having a generally semicircular trailing edge and the rear wing having a generally semicircular leading edge.

8 Claims, 9 Drawing Figures

AIRCRAFT

BACKGROUND OF THE INVENTION

This invention relates to aircraft, and more particularly to a vertical takeoff and landing (VTOL) aircraft of the type shown in my U.S. Pat. No. 3,640,485, issued Feb. 8, 1972.

SUMMARY OF THE INVENTION

Among the several objects of this invention may be noted the provision of an improved VTOL aircraft wherein, for a given power input, the lift is increased; the provision of such an aircraft which is readily maneuverable during takeoff, flight and landing; the provision of such an aircraft which, while capable of increased lift, is subject to reduced drag during flight; the provision of such an aircraft in which the power source is isolated from the fuselages thereby to minimize the noise level in the passenger compartments during operation of the aircraft; the provision of such an aircraft having twin fuselages adapted to be maintained generally horizontal during flight; the provision of such an aircraft having a protected propulsion system (e.g., rotor blades) for reducing the danger of damage to the system; and the provision of such an aircraft having fewer moving parts and precision mechanisms for lower manufacturing and maintenance costs.

In general, an improved aircraft of this invention comprises a generally annular wing structure surrounding a circular central structure forming an annular air duct, a first fuselage extending longitudinally of the aircraft at one side of the wing structure, and a second fuselage extending longitudinally of the aircraft at the other side of the wing structure. Rotor means carried by the central structure comprises a plurality of rotor blades extending radially across the duct from the central structure, the blades being rotatable relative to the central structure around the duct for inducing airflow through the duct to effect a lift on the aircraft. The annular wing structure consists of forward and rear wings having cross sections forming air foils. The forward wing has a generally semicircular trailing edge and the rear wing has a generally semicircular leading edge with these edges defining a circle generally concentric with and spaced from the central structure.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
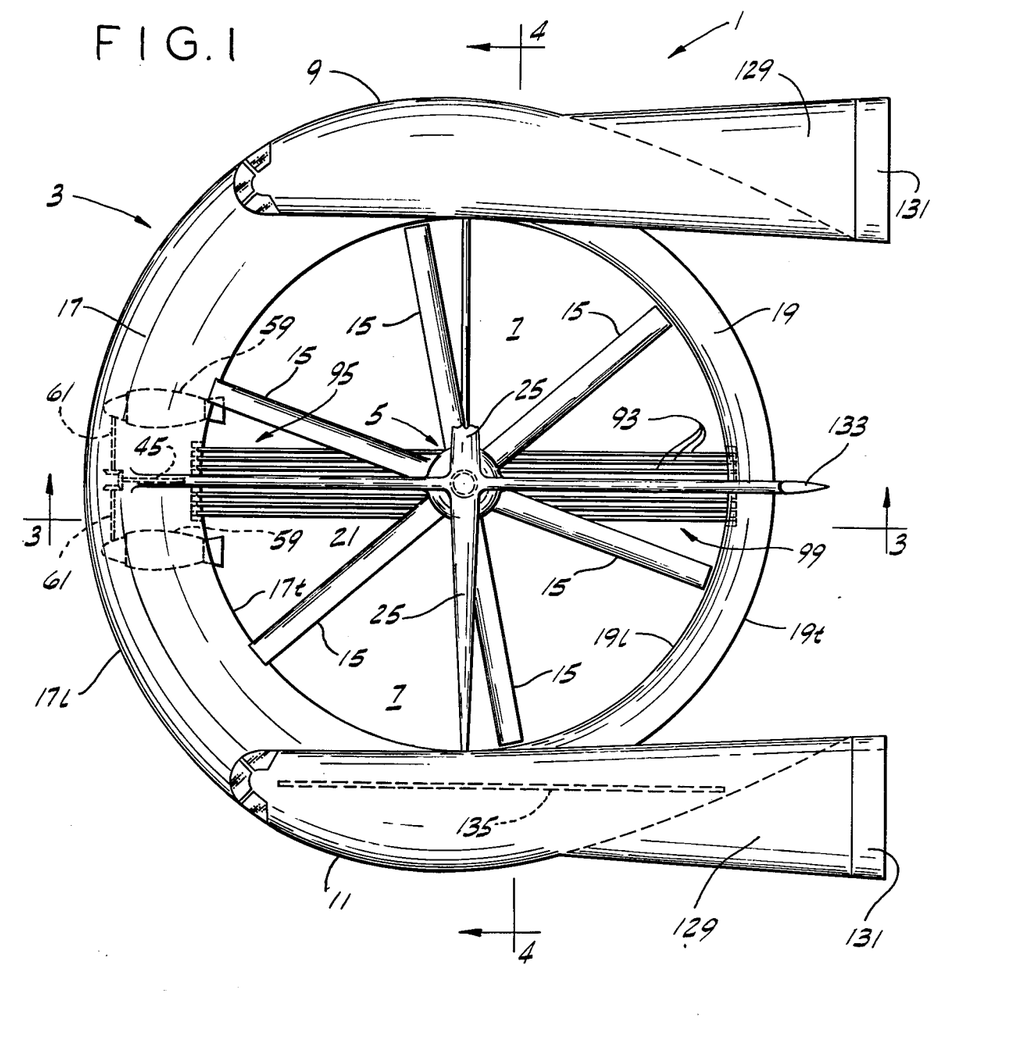
FIG. 1 is a plan of an aircraft of this invention.
Figures 3, 4:
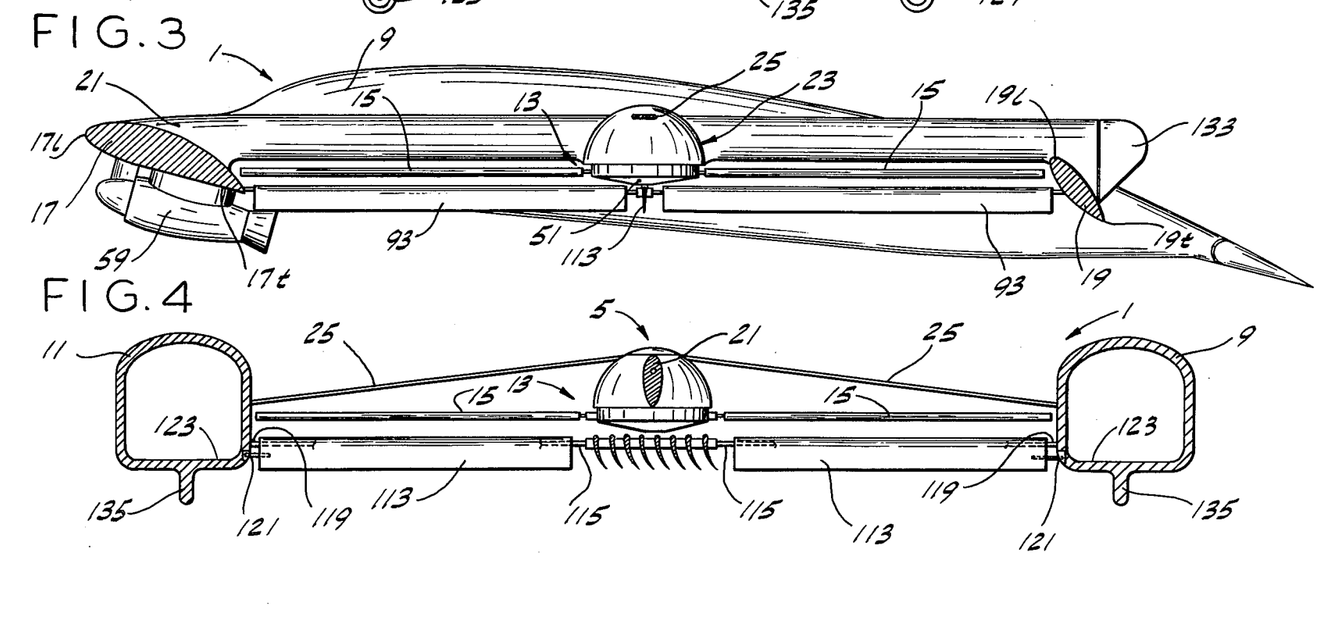
FIG. 3 is a vertical longitudinal section on line 3—3 of FIG. 1.
FIG. 4 is a vertical transverse section on line 4—4 of FIG. 1.
Figure 5:
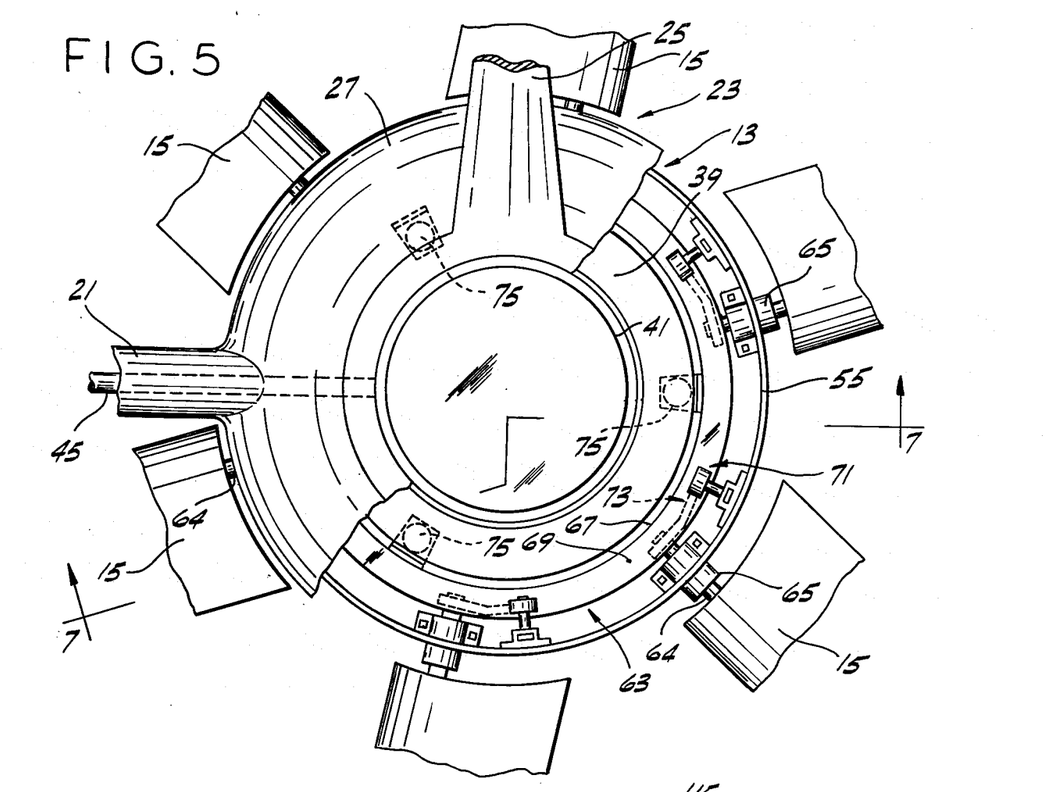
FIG. 5 is an enlarged fragment of FIG. 1 with parts broken away to show details.
Figure 6:
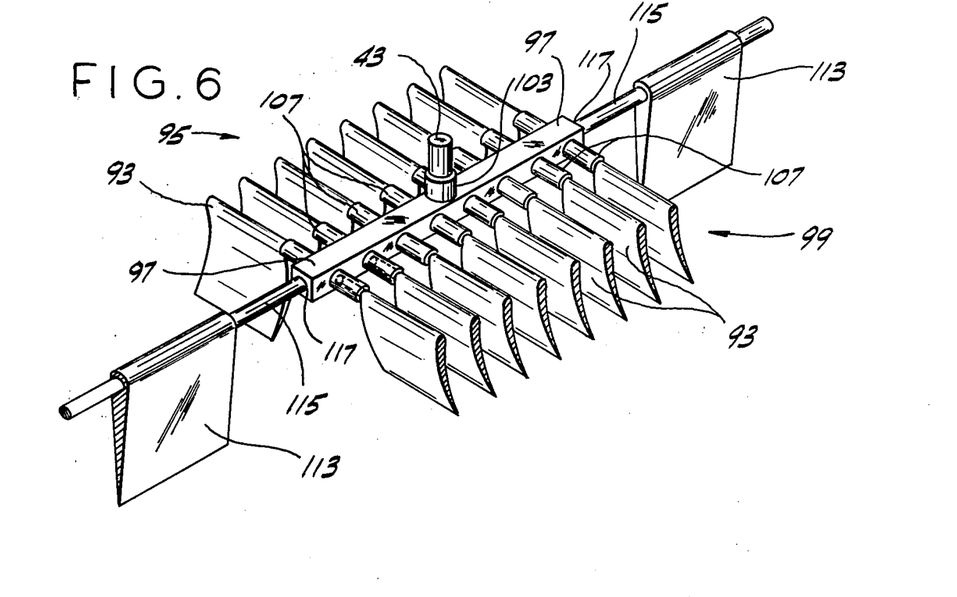
FIG. 6 is a perspective illustrating certain navigational control elements.

Referring to the drawings, first more particularly to FIGS. 1 and 3, an aircraft of this invention, designated in its entirety by the reference numeral 1, is shown to comprise a generally annular wing structure 3 surrounding a circular central structure indicated generally at 5 to form an annular air duct 7 in the form of a venturi. A first fuselage 9 extends longitudinally of the aircraft at one side of the wing structure 3 (its right side) and a second fuselage 11 extends longitudinally of the aircraft at the opposite side (the left side) of the wing structure. Carried by the central structure 5 and indicated generally at 13 is a rotor means comprising a plurality of cantilever rotor blades, each designated 15. These blades, which are of air foil cross section, extend radially across the air duct 7 and are rotatable relative to the central structure around the air duct on the vertical central axis of the central structure for inducing flow of air down through the duct to effect a lift on the aircraft 1. Six rotor blades are shown, and it will be understood that any suitable number of blades may be used without departing from the scope of this invention. The blades are located in the plane of and are surrounded by the annular wing structure 3, the latter thus protecting the blades from damage.

The annular wing structure 3 comprises a forward wing 17 having generally semicircular leading and trailing edges 17*l* and 17*t* and a rear wing 19 having generally semicircular leading and trailing edges 19*l* and 19*t*, the semicircles of these edges being generally centered in the vertical axis of the central circular structure 5. As shown in FIG. 1, the annular air duct 7 is constituted by the space between the central circular structure and the semicircular trailing and leading edges 17*t* and 19*l* of the forward and rear wings, respectively, which edges 17*t*, 19*l* are generally on a circle generally concentric with the vertical central axis of structure 5. Each of the wings 17 and 19 has an air foil cross section (see FIG. 3). The forward wing 17 is of substantially longer cross section than the rear wing and has a generally forward angle of air attack. Rotation of the rotor blades 15 around the duct 7 causes a high-velocity flow of air over the upper surface of the forward wing which, in accordance with aerodynamic principles, provides lift augmenting the lift due to the downflow of air through the annular air duct 7. The rear wing 19 also has a forward angle of air attack.

A rigid truss or bridge 21 extends longitudinally of the aircraft in its central vertical longitudinal plane bridging the forward and rear wings 17 and 19. The circular central structure 5 comprises a housing in the form of a dome generally designated 23 at the center of this bridge, the dome forming the central part of the bridge. The dome is braced against side sway by means of tie bars 25 connected in tension between the dome and the fuselages 9 and 11 in the central vertical transverse plane of the aircraft. The dome 23 comprises a lower annular shell 27 forming the central part of the bridge, and a cover 29 for the shell secured on an upper ring 31 inverted on the rim 33 of the shell. The dome further comprises a lower ring 35 within the shell adjacent the open bottom of the shell. Frames 37 brace the rings and support an annular platform 39 within the dome adjacent its open bottom concentric with the dome. Mounted on this platform is a gear box 41 having an output shaft 43 extending down from the bottom of the box on the vertical axis of the dome. Conventional gearing in the box transmits power from a main drive shaft 45 to the output shaft 43, the drive shaft 45 extending longitudinally of the aircraft generally in the central vertical longitudinal plane of the aircraft from the forward wing 17 through the forward part of the bridge 21 to the input of the gear box at 47. The output shaft 43 extends down through a tubular bearing 49 at the lower end of the gear box, this bearing being generally centered in the central opening 51 of the annular platform 39.

The rotor blades 15 are carried by and extend radially outwardly from a central rotor member 51 constituted by a dished disk having a hub 53 secured on the shaft 43 below the bearing 49 and an upwardly directed annular rim 55 which extends up into the dome 23 between the lower end portion of the dome and the periphery of the annular platform 39. The rotor blades 15 extend radially outwardly from the rim 55 of the rotor member 51 and are spaced at equal intervals (at 60° intervals in the case of six blades) around the rim 55 of the rotor member. The main drive shaft 43 is adapted to be driven to drive the rotor member 51 and blades 15 via the gear box 41 by means of a pair of suitable engines 59 mounted on the bottom of the forward wing 17 on opposite sides of the central vertical longitudinal plane of the aircraft and connected to drive the shaft 45 via suitable transmissions as indicated at 61. The arrangement is preferably such that both engines may be used for takeoff (and landing) with one engine sufficient for powering the rotor blades 15 after the desired altitude and speed have been attained. With the engine located on the forward wing, the noise level in the fuselages 9 and 11 during operation of the engines is minimized for passenger comfort.

For ready maneuvering of the aircraft, the rotor blades 15 are supported by the rotor member 51 in such manner as to enable the angle of attack of the blades readily to be changed, and circular cam means indicated generally at 63 is provided for changing the angle of attack of the blades. Thus, blades 15 have pivot shafts 64 at their inner ends rotatable in radial bearings 65 spaced at equal intervals (e.g., 60° intervals for six blades) around the rim 55 of the rotor member 51, enabling each blade to swing about the axis of its pivot shaft for changing its angle of attack. Means 63 comprises a swash ring 67 having an outer radial flange forming in effect an annular cam 69. The ring 67 surrounds the output shaft 43 and is located in the central rotor member 51 adjacent its rim 55 below the annular platform 39. Cam follower means indicated generally at 71 is engageable with opposite sides of the cam 69 and is connected via linkages 73 to the rotor blade pivot shafts 64 in such manner that the blades are swung and their angle of attack changed as the elevation and/or tilt of the cam is varied, as will appear.

Means for universally raising, lowering and tilting the swash ring 67 is shown to comprise a plurality of hydraulic cylinders 75 extending down from the bottom of the annular platform and spaced at equal intervals (e.g., 120° for three cylinders) around the platform. Piston rods 77 extend down from pistons (not shown) in the cylinders 75 to univeral ball joint connections at 79 with the swash ring. By selectively actuating the cylinders, the swash ring 67 and cam 69 may be hydraulically raised and lowered while either level or tilted to any desired angle with respect to the platform 39 (and the plane of the annular wing structure 3).

Figure 8:
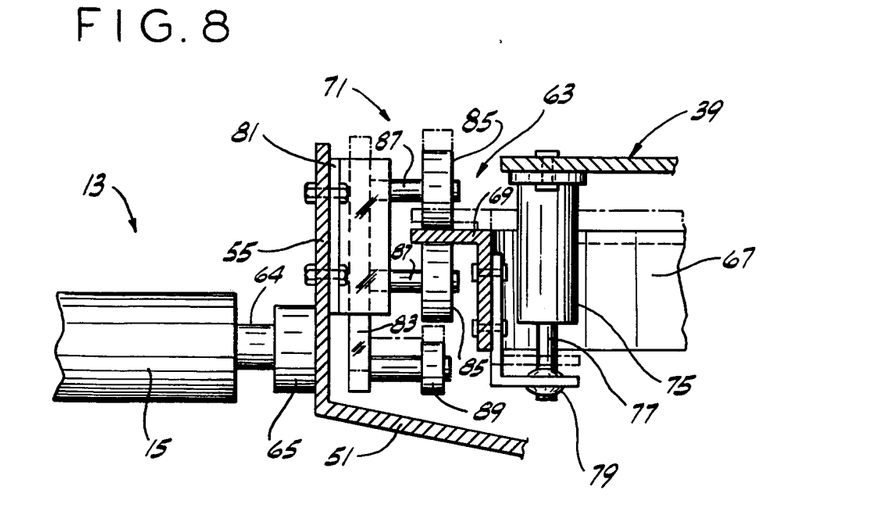
FIG. 8 is an enlarged fragment of FIG. 7.
Figure 9:
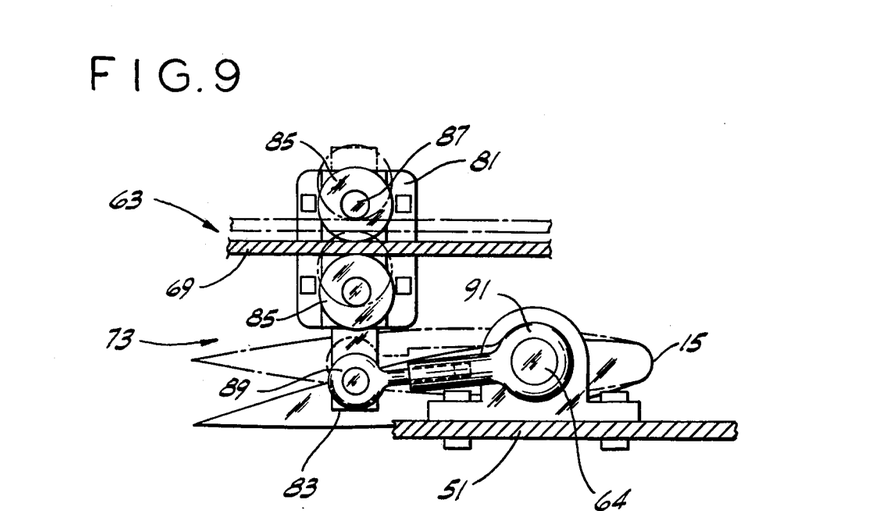
FIG. 9 is a vertical section on line 9—9 of FIG. 8.

Linkages 63, which connect the rotor blade pivot shafts 64 to the cam follower means 71 for varying the angle of attack of the blades as the elevation and/or tilt of the cam 69 is changed, are shown in FIGS. 8 and 9 each to comprise a guide block 81 mounted on the inside of the rim 55 of the central rotor member 51 generally above and to the side of a respective pivot shaft 64 and an elongate control bar 83 slidable vertically in the block. Carried by the control bar 83 is the cam follower means 71, the latter comprising a pair of rollers 85 journaled on shafts 87 projecting from the upper end of the bar toward the swash ring 67. As shown, the rollers are spaced apart for rolling contact with both the top and bottom surfaces of the cam 69, this dual roller arrangement being effective for avoiding undesirable gyroscopic effects. Linkage 63 also includes a crank means comprising a crank arm 89 pinned at its left and (as viewed in FIG. 9) to the lower end of the bar 83 and having its right end axially slidable in a crank 91 which is keyed to the pivot shaft 64. Thus, when the swash ring 67 and cam 69 are raised (via hydraulic cylinders 75), for example, the cam acts via the cam follower means 71 to pull the control bar 83 upwardly from the position shown in solid lines in FIGS. 8 and 9 to the position shown in broken lines. This, in turn, rotates the crank arm 89 and crank 91 clockwise to pivot the shaft 64 and the rotor blade 15 thereon for reducing the angle of attack of the blade and, as a result, the lift induced by the blade. The crank arm 89 slides in the crank 91 upon rotation of the crank assembly to avoid binding of the control bar 83 in the guide block 81.

With the swash ring 67 and cam 69 generally level (i.e., parallel to the platform 39), the angle of attack of each blade during a revolution around the air duct remains substantially constant. By hydraulically raising or lowering the cam while level, the angle of attack of all the blades 15 is simultaneously and equally changed via cam follower means 71 and linkages 63 for controlling the magnitude of the vertical lifting thrust induced by rotation of the blades. When the cam 69 is tilted (by selectively actuating the hydraulic cylinders 75), the angle of attack of each blade varies as it revolves around the air duct inasmuch as the rollers 85 ride opposite high and low parts of the cam. With the cam tilted down toward one side of the aircraft, the blades 15 are pivoted counterclockwise while engaging the lower part of the tilted cam for increasing their angle of attack and, as a result, the lift on that side of the aircraft. Conversely, when engaging the opposite high part of the cam, the blades are rotated clockwise for reducing the angle of air attack and, therefore, the lift on the opposite side of the aircraft. Consequently, a resultant moment tending to tilt the aircraft is created. It will be understood, therefore, that by adjusting the swash ring 67 and cam 69 to the appropriate angular position, a moment may be established for trimming the craft to any desired nonlevel attitude (so that the aircraft may, for example, be caused to bank in a turn) or for counterbalancing forces, e.g., air gusts, shifts in payload, etc. tending to tilt the aircraft from level flight.

Figure 7:
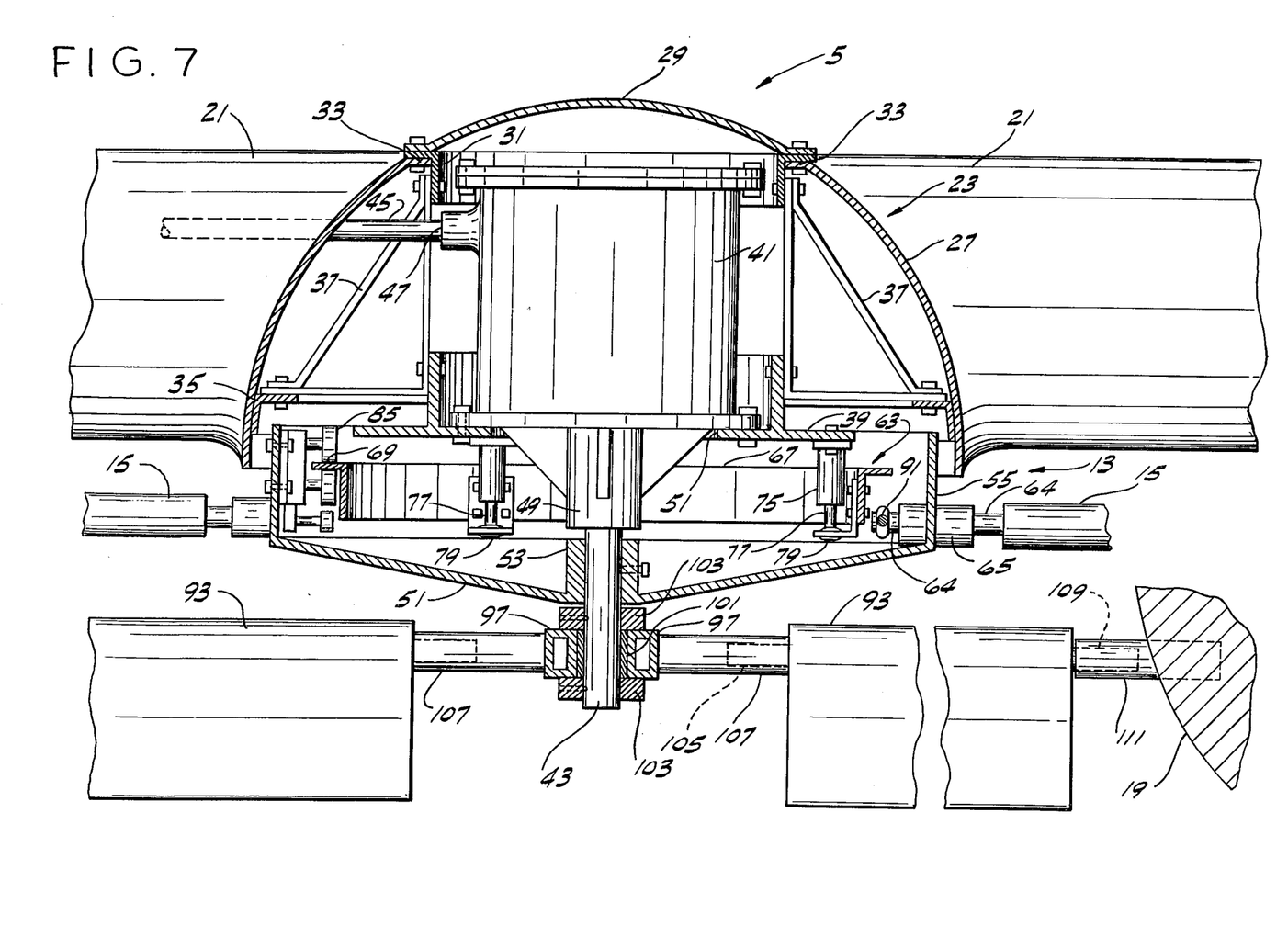
FIG. 7 is a vertical section on line 7—7 of FIG. 5.

Counterrotation vanes 93, of airfoil cross-section, are provided for countering the torque reaction on the aircraft of the rotating blades 5 to prevent the aircraft from rotating on the axis of shaft 43. These vanes 93 are arranged in two sets, a forward set 95 extending from a central vane support 97 which extends transversely of the aircraft at the lower end of the shaft 43 to the forward wing 17, and a rearward set 99 extending from the central vane support 97 to the rear wing 19 in a plane below the plane of the rotor blades 15. Each set comprises a plurality of vanes (e.g., eight vanes) extending parallel to one another on opposite sides of the central vertical longitudinal plane of the aircraft. The central vane support 97 is in the form of an elongate bar having a vertical bearing 101 at its center in which the lower end of shaft 43 is rotatable, the shaft having collars 103 above and below the bar. The airfoil section vanes 93 have shafts 105 at their inner ends received in bearings 107 on the sides of the bar 97 and shafts 109 at their outer ends received in bearings indicated at 111 on the wings (see FIG. 7) for pivoting the vanes for swinging moment about axes extending longitudinally of the vanes (and longitudinally of the aircraft). Suitable controls are provided in the wings for varying the pitch of the vanes in each set 95, 99, the pitch employed being such as to provide the proper balancing torque on the aircraft to offset the torque on the central structure 3 caused by rotation of the blades 15. The vanes are also useful in that by appropriately adjusting the pitch of the vanes in the forward and rear banks 95, 99, a resultant lateral force may be achieved for navigating the aircraft in a side-to-side direction without tilting the aircraft (especially desirable during takeoff and landing).

Navigation fins 113 are provided for maneuvering the aircraft forwardly and rearwardly in a generally level attitude (which, again is especially desirable during takeoff and landing). These fins are rotatably mounted on a pair of lower tie bars 115 extending from the vane support bar 97 to the fuselages 9, 11 in the central vertical transverse plane of the aircraft, the tie bars being connected at 117 to opposite ends of the vane support and at 119 to the fuselages where suitable mechanisms 121 are located for adjusting the pitch of the fins to achieve the desired forward and rearward motion. The lower tie bars 115 also act as tension members and assist the upper tie bars 25 in bracing the central structure 5 against side sway.

Figure 2:
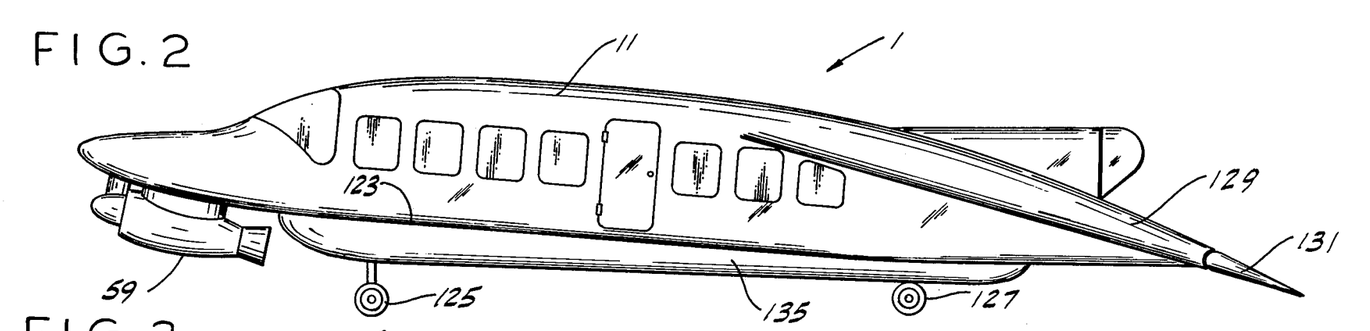
FIG. 2 is a side elevation of the aircraft.

With the aircraft at rest on the ground as shown in FIGS. 2 and 3, the rotor blades 15 lie generally in a horizontal plane and the floor 123 of each fuselage slopes downwardly from the front to the rear of the aircraft. This comparative slope between the fuselage floors and the plane of the rotor blades 15 avoids excessive floor inclination when the aircraft is cruising since the rotor blades should, at such time, preferably be at a forward angle (i.e., the blades slope upwardly from the front to the rear of the aircraft). As illustrated, forward and rear landing wheel assemblies indicated at 125 and 127, respectively, are provided on the underside of each fuselage 9, 11.

The aircraft 1 has a wide downwardly sloping tail 129 extending rearwardly from each of the fuselages 9, 11 for providing rear lift to counterbalance the lift produced by the forward wing 17. A flap 131 is mounted at the rear of each tail for swinging about an axis extending generally transversely of the aircraft between the positions shown in broken lines in FIG. 2. These flaps increase the maneuverability of the aircraft and may be used for trimming the aircraft in flight, banking the aircraft into a turn, and other maneuvers. A rudder 133 mounted on the aft end of the bridge 21 at the center of the rear wing 17 (FIGS. 1 and 3) constitutes auxiliary means for controlling the aircraft during horizontal flight and turning.

A deflector fin 135 extends along the bottom of each fuselage for preventing the air blown through the air duct from flowing laterally beneath the fuselages, instead deflecting the air downwardly for maximizing the lift generated by the rotor blades 15 (see FIGS. 2 and 4). This is particularly important during takeoff and landing maneuvers when maximum lifting power is essential.

In view of the above, it will be seen that the several objects of the invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

What is claimed is:

1. An aircraft comprising a generally annular wing structure surrounding a circular central structure forming an annular air duct, said central structure having a vertical central axis, a first fuselage extending longitudinally of the aircraft at one side of the wing structure, a second fuselage extending longitudinally of the aircraft at the opposite side of the wing structure, rotor means carried by said central structure comprising a plurality of rotor blades extending radially across said duct, said blades being rotatable relative to said central structure around the duct generally on the vertical central axis of said central structure for inducing airflow through the duct to effect a lift on the aircraft, said annular wing structure comprising forward and rear wings forming air foils, the forward wing having a trailing edge and the rear wing having a leading edge which are generally on a circle generally concentric with the vertical central axis of the central structure, the trailing edge of the forward wing and the leading edge of the rear wing being semicircles of said circle, the annular air duct being constituted by the space between said central structure and said circle, the forward wing having a generally forward angle of air attack such that the rotation of said rotor blades around said duct causes a high-velocity airflow over the upper surface of the forward wing for increasing said lift, parallel counterrotation vanes extending across said air duct below the rotor blades and between said forward and rear wings generally parallel to the fuselages for preventing rotation of the aircraft in reaction to rotation of the blades, said vanes being mounted at their outer ends on said wing structure for swinging about their longitudinal axes, and a rotor drive shaft carried by the central structure and extending along the axis of rotation of said blades for rotating the blades around the duct, said vanes being arranged in forward and rearward sets extending from a central vane support at the lower end of the shaft to said forward and rearward wings, respectively.

2. An aircraft as set forth in claim 1 wherein navigation fins extend from said vane support to the fuselages generally perpendicular to said counterrotation vanes, said fins being swingable about axes extending longitudinally of the fins for controlling the axial flow of air through the duct thereby to allow navigation of the aircraft generally forwardly and rearwardly.

3. An aircraft comprising a generally annular wing structure surrounding a circular central structure forming an annular air duct, said central structure having a vertical central axis,     a first fuselage extending longitudinally of the aircraft at one side of the wing structure,     a second fuselage extending longitudinally of the aircraft at the opposite side of the wing structure, and     rotor means carried by said central structure comprising a plurality of rotor blades extending radially across said duct, said blades being rotatable relative to said central structure around the duct generally on the vertical central axis of said central structure for inducing airflow through the duct to effect a lift on the aircraft,     said annular wing structure comprising forward and rear wings forming air foils, the forward wing having a trailing edge and the rear wing having a leading edge which are generally on a circle generally concentric with the vertical central axis of the central structure, the trailing edge of the forward wing and the leading edge of the rear wing being semicircles of said circle, the annular air duct being constituted by the space between said central structure and said circle, the forward wing having a generally forward angle of air attack such that the rotation of said rotor blades around said duct causes a high-velocity airflow over the upper surface of the forward wing for increasing said lift,     parallel counterrotation vanes extending across said air duct below the rotor blades for preventing rotation of the aircraft in reaction to rotation of the blades, said vanes being mounted at their outer ends on said wing structure for swinging about their longitudinal axes, and     navigation fins extending across the air duct between said central structure and said fuselages at substantially the same elevation as said counterrotation vanes, said fins being swingable about axes extending longitudinally of the fins for controlling the axial flow of air through the duct thereby to allow navigation of the aircraft generally forwardly and rearwardly.

4. An aircraft comprising a generally annular wing structure surrounding a circular central structure forming an annular air duct, a first fuselage extending longitudinally of the aircraft at one side of the wing structure, a second fuselage extending longitudinally of the aircraft at the opposite side of the wing structure, rotor means carried by said central structure comprising a rotor member rotatable relative to the central structure and a plurality of rotor blades pivoted to the rotor member and extending radially outwardly therefrom toward the annular wing structure across said duct, said blades being rotatable relative to said central structure around the duct for inducing airflow through the duct to effect a lift on the aircraft, said annular wing structure comprising forward and rear wings forming air foils, the forward wing having a generally semicircular trailing edge, and the rear wing having a generally semicircular leading edge, said edges defining a circle generally concentric with and spaced from said circular central structure, circular cam means carried by the central structure and disposed around the axis of rotation of said blades, means rigidly carried by the central structure for tilting the cam means in any of various directions relative to the central structure and for changing the elevation of the cam means relative to the blades at any or no tilt while preventing rotation of the cam means relative to the central structure, follower means engageable with opposite sides of the cam means at any tilt and elevation thereof, and linkages connecting the rotor blades with the follower means for pivoting the blades whereby the angle of air attack of the blades is simultaneously and equally changed when the elevation of the cam means is changed and the angle of attack of each blade is varied from a maximum to a minimum during one revolution of the blade around said duct when the cam means is tilted, each of said linkages comprising a guide block on said rotatable ring, a control bar slidable in the guide block in a direction parallel to the axis of rotation of the rotatable ring and having said follower means secured thereto, and a crank means connecting the control bar and a respective rotor blade pivot whereby the bar is adapted to slide in the guide when the elevation of said cam means is changed thereby to rotate the crank means and the rotor blade pivot for pivoting the blade.

5. An aircraft as set forth in claim 4 wherein said follower means comprises a pair of rollers mounted on the control bar for rolling engagement with the top and bottom of the cam means.

6. An aircraft comprising a generally annular wing structure surrounding a circular central structure forming an annular air duct, said central structure having a vertical central axis,     a first fuselage extending longitudinally of the aircraft at one side of the wing structure,     a second fuselage extending longitudinally of the aircraft at the opposite side of the wing structure,     rotor means carried by said central structure comprising a plurality of rotor blades extending radially across said duct, said blades being rotatable relative to said central structure around the duct generally on the vertical central axis of said central structure for inducing airflow through the duct to effect a lift on the aircraft,     said annular wing structure comprising forward and rear wings forming air foils, the forward wing having a trailing edge and the rear wing having a leading edge which are generally on a circle generally concentric with the vertical central axis of the central structure, the trailing edge of the forward wing and the leading edge of the rear wing being semicircles of said circle, the annular air duct being constituted by the space between said central structure and said circle, the forward wing having a generally forward angle of air attack such that the rotation of said rotor blades around said duct causes a high-velocity airflow over the upper surface of the forward wing for increasing said lift,     a tail extending rearwardly from each of said fuselages, and     a rudder mounted at the center of said rear wing between said tails.

7. An aircraft as set forth in claim 6 wherein each of said tails has a flap mounted at its rear for rotation about an axis extending generally transversely of the aircraft.

8. An aircraft comprising a generally annular wing structure surrounding a circular central structure forming an annular air duct, said central structure having a vertical central axis,     a first fuselage extending longitudinally of the aircraft at one side of the wing structure,     a second fuselage extending longitudinally of the aircraft at the opposite side of the wing structure, rotor means carried by said central structure comprising a plurality of rotor blades extending radially across said duct, said blades being rotatable relative to said central structure around the duct generally on the vertical central axis of said central structure for inducing airflow through the duct to effect a lift on the aircraft, said annular wing structure comprising forward and rear wings forming air foils, the forward wing having a trailing edge and the rear wing having a leading edge which are generally on a circle generally concentric with the vertical central axis of the central structure, the trailing edge of the forward wing and the leading edge of the rear wing being semicircles of said circle, the annular air duct being constituted by the space between said central structure and said circle, the forward wing having a generally forward angle of air attack such that the rotation of said rotor blades around said duct causes a high-velocity airflow over the upper surface of the forward wing for increasing said lift, and deflector fins extending longitudinally along the bottom of said fuselages for deflecting downwardly the axial flow of air through said duct.

* * * * *